United States Patent
Holt et al.

(10) Patent No.: US 9,080,765 B2
(45) Date of Patent: Jul. 14, 2015

(54) SYSTEMS AND METHODS FOR HEAT RECOVERY STEAM GENERATION OPTIMIZATION

(75) Inventors: Joel Donnell Holt, Scotia, NY (US); William Barrett Julian, Roanoke, VA (US); Ashok Dattatraya Acharya, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 849 days.

(21) Appl. No.: 13/215,072

(22) Filed: Aug. 22, 2011

(65) Prior Publication Data
US 2013/0047613 A1    Feb. 28, 2013

(51) Int. Cl.
| | |
|---|---|
| G05B 13/02 | (2006.01) |
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| G01B 3/44 | (2006.01) |
| G01B 3/52 | (2006.01) |
| G06F 17/50 | (2006.01) |
| F22B 1/18 | (2006.01) |
| F01K 13/02 | (2006.01) |

(52) U.S. Cl.
CPC ............... *F22B 1/1815* (2013.01); *F01K 13/02* (2013.01); *Y02E 20/16* (2013.01)

(58) Field of Classification Search
CPC ....... Y02E 10/723; Y02E 10/72; Y02E 10/00; Y02E 20/00; Y02E 20/36
USPC ........ 700/29, 32, 44, 51, 52, 54, 287; 702/34, 702/182–183; 703/13, 18
See application file for complete search history.

(56) References Cited

U.S. PATENT DOCUMENTS

| | | | |
|---|---|---|---|
| 2007/0055392 | A1 | 3/2007 | D'Amato et al. |
| 2009/0217665 | A1 * | 9/2009 | Holzhauer et al. ............... 60/645 |
| 2010/0100248 | A1 * | 4/2010 | Minto et al. ................... 700/287 |
| 2012/0290104 | A1 * | 11/2012 | Holt et al. ........................ 700/29 |
| 2013/0176418 | A1 * | 7/2013 | Pandey et al. ................... 348/83 |

OTHER PUBLICATIONS

U.S. Appl. No. 12/907,187, filed Oct. 19, 2010, Julian et al.

\* cited by examiner

*Primary Examiner* — Ronald Hartman, Jr.
(74) *Attorney, Agent, or Firm* — Fletcher Yoder, P.C.

(57) ABSTRACT

The embodiments described herein include a system and a method. In a first embodiment, a system includes a controller configured to control power plant operations. The system further includes a heat recovery steam generator (HRSG) monitor communicatively coupled to the controller and configured to receive inputs corresponding to the power plant operations. The system additionally includes an HRSG life prediction model configured to predict an operating life for an HRSG component. The HRSG monitor uses the HRSG life prediction model and the inputs to communicate a control action to the controller.

20 Claims, 4 Drawing Sheets

SYSTEMS AND METHODS FOR HEAT RECOVERY STEAM GENERATION OPTIMIZATION

BACKGROUND

The present invention relates to a system and a method of power plant component optimization, and more particularly to optimization of a heat recovery steam generation (HRSG).

Current control systems attempt to load (or unload) turbines, HRSGs, and various other components of a power plant using desired loading rates. If the loading rates for various turbines are very high, large thermal gradients may develop in the HRSG leading to high stresses and uneven thermal expansion that may result in shorter equipment life. On the other hand, slow loading rates may reduce thermal gradients and lengthen equipment life, but the slow loading rates may increase fuel costs and reduce plant availability. Accordingly, the current controls may categorize the start-ups as hot, warm or cold. Each of these start-up states uses loading rates slow enough to protect the components of the HRSG for any startup in the same category, but may be sub-optimal for many uses. Consequently, such controlling methods may result in sub-optimal performance and higher operating costs. Therefore there is a need for an improved system and method for optimizing usage of the HRSG.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a controller configured to control power plant operations. The system further includes a heat recovery steam generator (HRSG) monitor communicatively coupled to the controller and configured to receive inputs corresponding to the power plant operations. The system additionally includes an HRSG life prediction model configured to predict an operating life for an HRSG component. The HRSG monitor uses the HRSG life prediction model and the inputs to communicate a control action to the controller.

In a second embodiment, a method includes receiving field instrument data and operator input, and calculating a current heat recovery steam generator (HRSG) stress based on the field instrument data and the operator input. The method further includes projecting a turbine system condition based on the field instrument data and the operator input. The method also includes calculating a predicted HRSG stress based on the turbine system condition and identifying a peak HRSG stress based on the predicted HRSG stress. The method additionally includes deriving a control strategy and outputting a control action based on the control strategy.

In a third embodiment, a system includes a controller configured to control plant operations. The controller includes a heat recovery steam generator (HRSG) monitor configured to monitor the plant operations. The controller further includes an HRSG life prediction model configured to predict a stress in an HRSG component. The controller is configured to use the HRSG monitor and the HRSG predictive stress model to derive control actions.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The systems and methods described herein enable a more optimal control and usage of an HRSG. The HRSG may be used to reclaim thermal energy from various systems and processes in a plant, such as a power plant. For example, the excess heat energy produced during combustion of a gas turbine may be converted into steam by the HRSG, and the steam may then be used to power a steam turbine. The HRSG may be designed to more optimally recapture heat for a certain power plant by incorporating certain design inputs. That is, the HRSG and the HRSG components (e.g., duct burner, superheater, evaporator, economizer) may be designed to include certain pressure vessel (e.g., boiler) sizes, wall thicknesses, tubing or coil sizes, temperature ratings, pressure ratings, flow openings, and so on, based on the components used in the plant (e.g., type of gas and steam turbines) and the plant's preferred usage modality (e.g., diesel powered power plant). During the operational life of the HRSG, the HRSG may experience thermal expansions and contractions, mechanical stresses, creep stresses (e.g., deformation stress), and fatigue, which may impact the operational lifetime of the HRSG.

In one embodiment, a HRSG monitor, hereinafter referred to as a stress predictor and life counter (SPLC), may receive inputs from a variety of sensors included in plant components, such as gas turbine sensors, steam turbine sensors, expanders, and the like. The SPLC may also receive inputs from sensors included in the HRSG, such as temperature sensors, pressure sensors, flow sensors, and vibration sensors, as described in more detail below. In one embodiment, the SPLC may process the sensor inputs and calculate a remaining life for the HRSG. That is, the SPLC may enable the prediction of the remaining operational life of the HRSG based on the usage of the HRSG and/or predicted stress levels. For example, the operational usage and measurements (e.g., temperature measurements, flow rates, vibration measurements, pressures, stress, strain) of various components of the HRSG (e.g., duct burner, superheater, evaporator, economizer) may be monitored, and life prediction models (e.g., physics-based models, statistical models, knowledge-based models) may be used to predict remaining life of the HRSG and the HRSG components.

Additionally, the systems and methods described herein provide a user, such as a power plant operator, with decision support information suitable for optimizing plant utilization and operational life. For example, energy market conditions may be such that it would be desirable to operate the power plant at a higher than expected load. The SPLC may provide the user with a predicted impact of the higher load usage on the HRSG life. Accordingly, the user may make more informed decisions, such as calculating the return on investment of running at a higher load, the impact on maintenance schedules, and the procurement of spare parts.

Further, the SPLC may be used for dynamic control (e.g., closed loop control, open loop control) of the power plant. For example, the user may select a desired HRSG operational mode and the SPLC may controllably interface with the various plant components to provide for the desired operational mode. For example, the user may select a HRSG life maximizing mode, and the SPLC may then interface with the gas turbine to provide for control actions resulting in a turbine exhaust temperature, a turbine exhaust flow rate, and/or turbine exhaust pressure suitable for maximizing the life of the HRSG. Other operational modes may be selected, such as a gas turbine startup time minimizing mode, a fuel usage minimizing mode, a power output maximizing mode, and an economic conditions optimization mode, as described in more detail below. These modes may be used by the SPLC to control various aspects and components of plant operations, including gas turbines, steam turbines, fuel delivery systems, electrical generators, and the like. By continuously monitoring and predicting HRSG stresses and remaining life, and by incorporating the predictions as part of dynamic control of plant components, the systems and methods described herein may optimize the usage and life of the HRSG and increase the operational efficiency of the plant.

Figure 1:
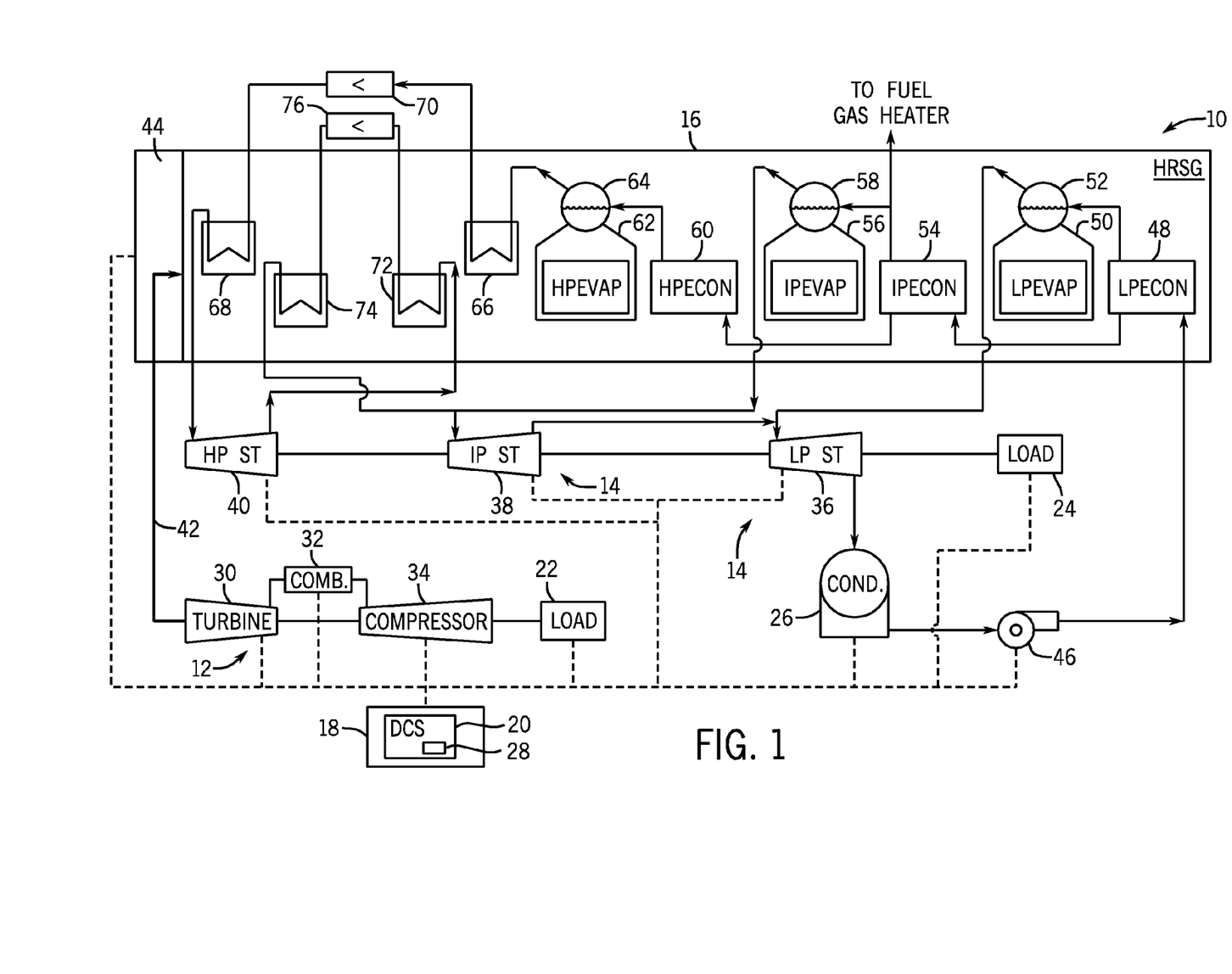
FIG. 1 is a schematic diagram of an embodiment of a power plant, having an HRSG with a monitor and control system having a stress predictor and life counter (SPLC)

Turning now to the figures, FIG. 1 is a schematic flow diagram of an embodiment of a combined cycle power generation system 10 having a gas turbine 12, a steam turbine 14, a HRSG system 16, and a controller 18 having a distributed control system (DCS) 20. The DCS 20 may be communicatively connected to various system 10 components, including the gas turbine 12, the steam turbine 14, the HRSG system 16, a first load 22, a second load 24, and a condenser 26. Indeed, the DCS 20 may be connected to a variety of system 10 components to provide control and analysis functions for the components. As described in more detail below, the DCS 20 includes a SPLC 28 suitable for receiving a set of inputs and for providing a set of outputs, including control outputs, useful for optimizing the HRSG 16 usage and optimizing the operational efficiency of the system 10. The DCS 20 and the SPLC 28 may include executable code instructions stored on a non-transitory tangible computer-readable medium, such as a volatile or non-volatile memory of the controller 18. It is also to be understood, that in another embodiment, the SPLC 28 may be a standalone system not included in the DCS 20 but may communicate with the DCS 20. Additionally, the SPLC 28 may be included in other industrial controls, such as a human-machine interface (HMI) software, a manufacturing execution system (MES), and/or a supervisor control and data acquisition (SCADA) system.

The system 10 may include the gas turbine 12 for driving the first load 22. The first load 22 may, for instance, be an electrical generator for producing electrical power. The gas turbine 12 may include a turbine 30, a combustor or combustion chamber 32, and a compressor 34. The system 10 may also include the steam turbine 14 for driving the second load 24. The second load 24 may also be an electrical generator for generating electrical power. However, both the first and second loads 22, 24 may be other types of loads capable of being driven by the gas turbine 12 and steam turbine 14. In addition, although the gas turbine 12 and steam turbine 14 may drive separate loads 22 and 24, as shown in the illustrated embodiment, the gas turbine 12 and steam turbine 14 may also be utilized in tandem to drive a single load via a single shaft. In the illustrated embodiment, the steam turbine 14 may include one low-pressure section 36 (LP ST), one intermediate-pressure section 38 (IP ST), and one high-pressure section 40 (HP ST). However, the specific configuration of the steam turbine 14, as well as the gas turbine 12, may be implementation-specific and may include any combination of sections.

The system 10 may also include the multi-stage HRSG 16. The components of the HRSG 16 in the illustrated embodiment are a simplified depiction of the HRSG 16 and are not intended to be limiting. Rather, the illustrated HRSG 16 is shown to convey the general operation of HRSG systems. Further the HRSG 16 may be provided as a single stage HRSG 16 or as any other type of HRSG. Heated exhaust gas 42 from the gas turbine 12 may be transported into the HRSG 16 via a duct burner 44 and used to heat steam for use in powering the steam turbine 14. The duct burner 44 may use supplementary firing to increase the heat energy of the exhaust 42, thus increasing the power output downstream of the HRSG 16. While the depicted embodiment shows one duct burner 44 at a single location, it is to be understood that multiple duct burners 44 may be used and may be positioned at various locations upstream or downstream from the depicted duct burner 44, as determined by a specific HRSG 16 design. Exhaust from the low-pressure section 36 of the steam turbine 14 may be directed into the condenser 26. Condensate from the condenser 26 may, in turn, be directed into a low-pressure section of the HRSG 16 with the aid of a condensate pump 46.

The condensate may then flow through a low-pressure economizer 48 (LPECON), a device configured to heat feedwater with gases, which may be used to heat the condensate. From the low-pressure economizer 48, a portion of the condensate may be directed into a low-pressure evaporator 50 (LPEVAP) having a pressure vessel 52 (e.g., boiler), while the rest may be pumped toward an intermediate-pressure economizer 54 (IPECON). Steam from the low-pressure evaporator 50 may be returned to the low-pressure section 36 of the steam turbine 14. Likewise, from the intermediate-pressure economizer 54, a portion of the condensate may be directed into an intermediate-pressure evaporator 56 (IPEVAP) having a pressure vessel 58 (e.g., boiler), while the rest may be pumped toward a high-pressure economizer 60 (HPECON). Steam from the intermediate-pressure evaporator 56 may be sent to the intermediate-pressure section 38 of the steam turbine 14.

Condensate from the high-pressure economizer 60 may be directed into a high-pressure evaporator 62 (HPEVAP) having a pressure vessel 64 (e.g., boiler). Steam exiting the high-pressure evaporator 62 may be directed into a primary high-pressure superheater 66 and a finishing high-pressure superheater 68, where the steam is superheated and eventually sent to the high-pressure section 40 of the steam turbine 14. Exhaust from the high-pressure section 40 of the steam turbine 14 may, in turn, be directed into the intermediate-pressure section 38 of the steam turbine 14. Exhaust from the intermediate-pressure section 38 of the steam turbine 14 may be directed into the low-pressure section 36 of the steam turbine 14.

An inter-stage attemperator 70 may be located in between the primary high-pressure superheater 66 and the finishing high-pressure superheater 68. The inter-stage attemperator 70 may allow for more robust control of the exhaust temperature of steam from the finishing high-pressure superheater 68. Specifically, the inter-stage attemperator 70 may be configured to control the temperature of steam exiting the finishing high-pressure superheater 68 by injecting cooler feedwater spray into superheated steam upstream of the finishing high-pressure superheater 68 whenever the exhaust temperature of the steam exiting the finishing high-pressure superheater 68 exceeds a predetermined value or as directed by the controller 18.

In addition, exhaust from the high-pressure section 40 of the steam turbine 14 may be directed into a primary re-heater 72 and a secondary re-heater 74 where it may be re-heated before being directed into the intermediate-pressure section 38 of the steam turbine 14. The primary re-heater 72 and secondary re-heater 74 may also be associated with an inter-stage attemperator 76 for controlling the exhaust steam temperature from the re-heaters. Specifically, the inter-stage attemperator 76 may be configured to control the temperature of steam exiting the primary re-heater 72 by injecting cooler feedwater spray into the superheated steam downstream of the primary re-heater 72 whenever the exhaust temperature of the steam exiting the primary re-heater 72 exceeds a predetermined value or as directed by the controller 18.

In combined cycle systems such as system 10, hot exhaust gas 42 may flow from the gas turbine 12 and pass through the HRSG 16 and may be used to generate high-pressure, high-temperature steam. The steam produced by the HRSG 16 may then be passed through the steam turbine 14 for power generation. In addition, the produced steam may also be supplied to any other processes where superheated steam may be used. The gas turbine 12 cycle is often referred to as the "topping cycle," or Brayton cycle, whereas the steam turbine 14 generation cycle (e.g., steam cycle) is often referred to as the "bottoming cycle" or Rankine cycle. By combining these two cycles as illustrated in FIG. 1, the combined cycle power generation system 10 may lead to greater efficiencies in both cycles. In particular, exhaust heat from the topping cycle may be captured and used to generate steam for use in the bottoming cycle.

During operations of the system 10, the various HRSG 16 components (e.g., duct burner 44, economizers 48, 54, 60, evaporizers 50, 56, 62, heaters 66, 68, 72, 74) may experience stress, such as thermally induced stress, mechanical stress, creep stress, and fatigue. The SPLC 28 may sense various conditions in the HRSG 16 components and system 10 components (e.g., gas turbine 12, steam turbine 14, loads 24, 26, condenser 26, and pump 46), such as temperature, pressure, flow rate, and vibration measurements, to derive a current stress for the HRSG 16 components and a remaining operational life of the HRSG 16 and HRSG 16 components. Indeed, the SPLC 28 may function as a "smart odometer," keeping track of the operational life of the HRSG 16 used during system 10 operations. Further, the SPLC 28 may use projected future operations for the system 10 components to calculate a predicted future stress for the HRSG 16, as described below in more detail with respect to FIG. 3. The SPLC 28 may use the predicted effect that operations of the system 10 components may have on the HRSG 16 and respond accordingly. For example, control actions may be issued by the DCS 20 that may enhance the operational life of the HRSG 16 while maintaining suitable performance in the HRSG 16 and the system 10. The control actions may thus provide for an improved stress curve during HRSG 16 operations, as opposed to non-optimized stress curves that may result from using traditional control techniques, as illustrated in FIG. 2.

Figure 2:
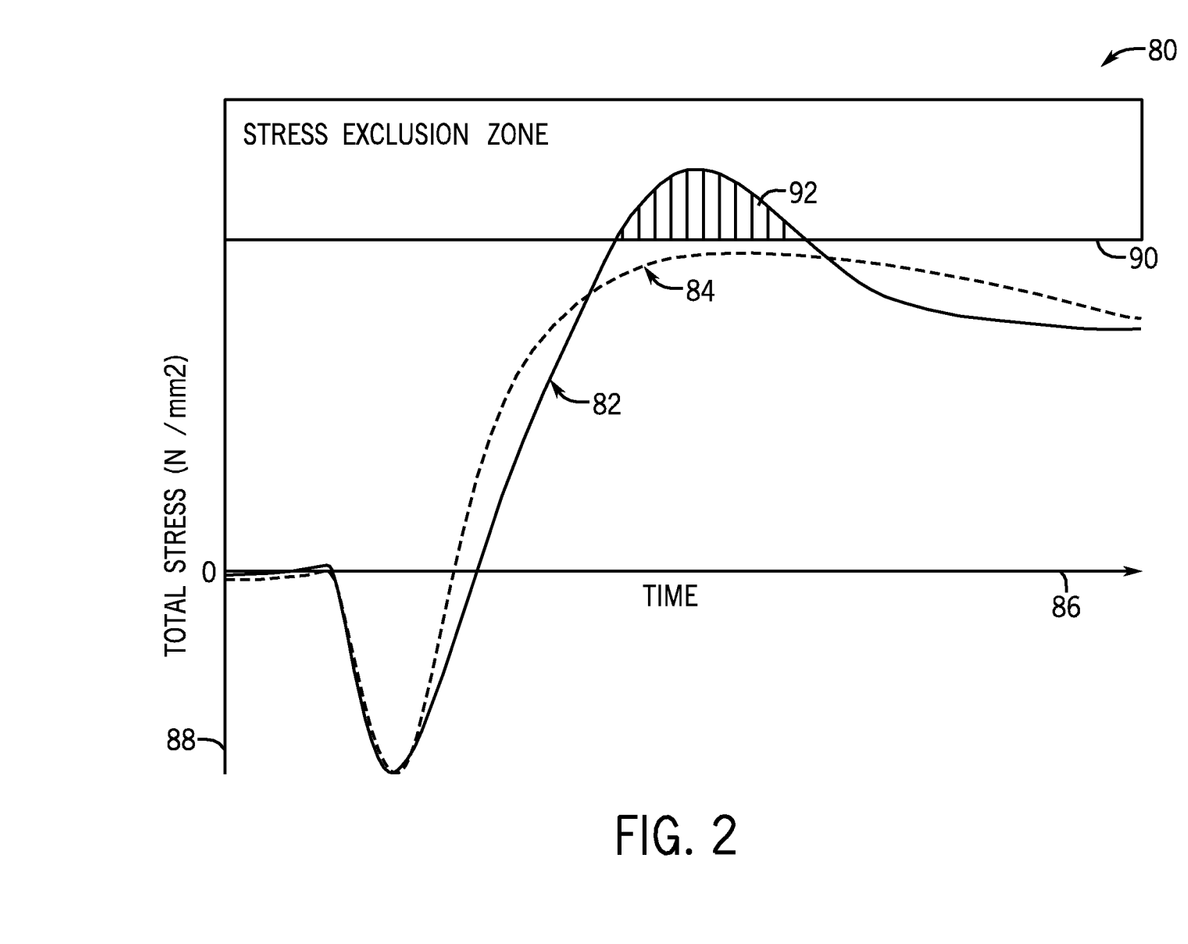
FIG. 2 is a graph of an embodiment of a un-optimized stress curve and an optimized stress curve using the embodiments of FIG. 1.

FIG. 2 is a graph 80 illustrating embodiments of a HRSG stress curve 82 that may be produced during traditional control processes and an optimized HRSG stress curve 84 that may be produced by using the techniques described herein. It is to be understood that curves 82 and 84 are example curves that may depict stresses during certain operations of the system 10, including loading, unloading, shutdown, trips, and the like. As depicted, the graph 80 includes an abscissa 86 having time measurements (e.g., milliseconds, seconds, minutes, hours) and an ordinal axis 88 having a stress measured in Newton per millimeter squared ($N/mm^2$). As the operating time 86 increases, the stress 88 on the components of the HRSG 16 (e.g., duct burner 44, economizers 48, 54, 60, evaporizers 50, 56, 62, heaters 66, 68, 72, 74) may be plotted as a curve (e.g., curves 82, 84). The graph 80 further includes a stress exclusion zone 90. More generally, the stress exclusion zone 90 is an area of operations having stresses at undesirable levels. Thus, operating at the stress exclusion zone 90 may result in unwanted reductions to the operational life of the HRSG 16.

Traditional control techniques may lead to the stress curve 82 entering into a portion 92 of the stress exclusion zone 90 during normal system operations. For example, traditional gas turbine 12 start operations may increase operating temperatures of various HRSG 16 components at a rate such that unwanted stresses develop during the portion 92 of the curve 82. Likewise, turbine unloading, tripping, shutdown, and other operational modes under traditional control techniques may result in unwanted stresses. The embodiments of the present invention may minimize or eliminate exposure of the HRSG 16 components to the stress exclusion zone 90, as depicted by the optimized HRSG stress curve 84. Indeed, control actions may be issued (e.g., setting a fuel delivery rate, opening or closing valves, driving pumps, driving actuators) that result in the optimized stress curve 84 avoiding the stress exclusion zone 90 and maximizing the HRSG's life. For example, a process, such as the process described in relation to FIG. 3, may be used to optimize HRSG 16 operations, including the maximization of the HRSG's 16 life.

Figure 3:
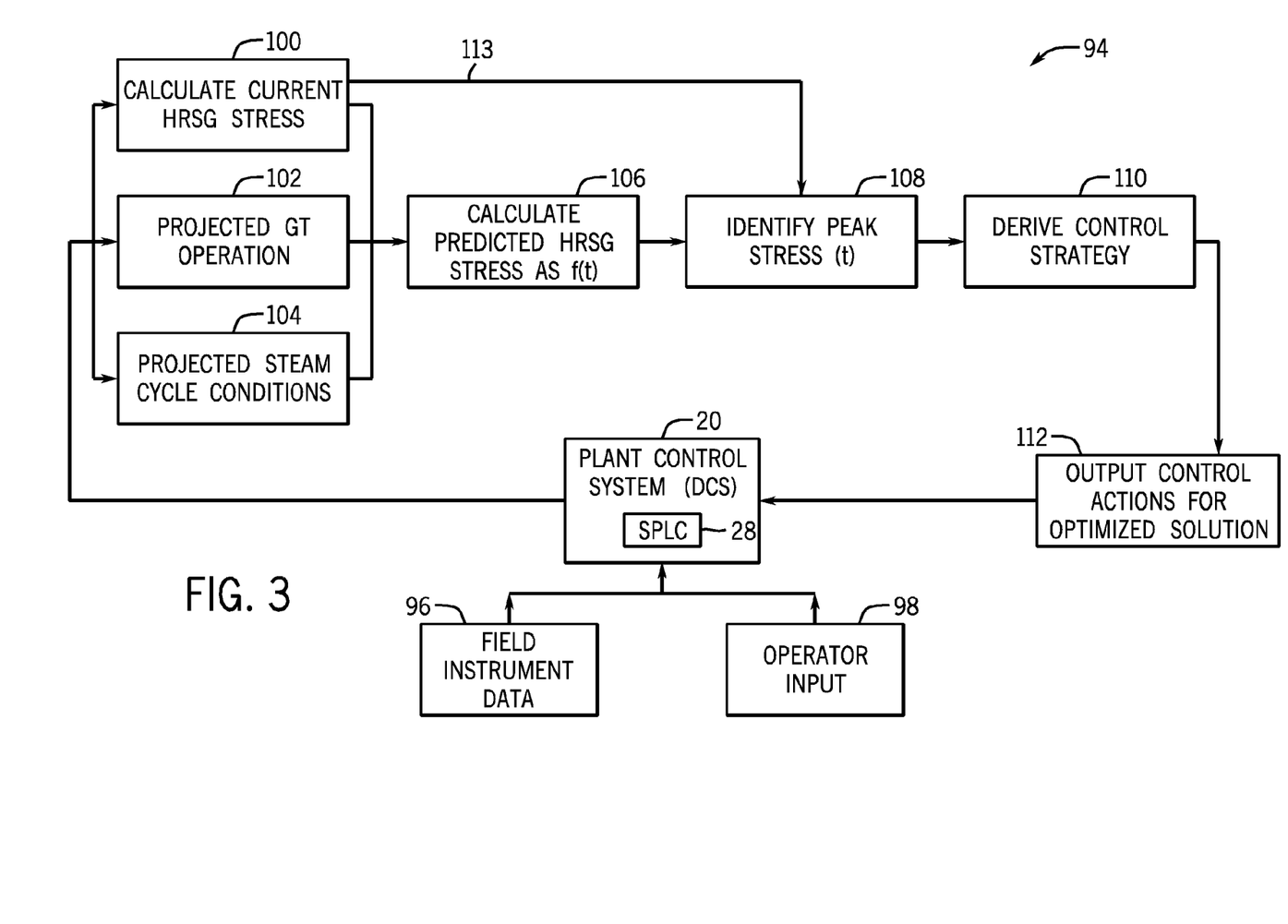
FIG. 3 is a flow chart of an embodiment of a process for improving system controls based on models.

FIG. 3 is a flow chart illustrating an embodiment of a process 94 suitable for optimizing HRSG 16 operations and for improving the efficiency of the system 10 depicted in FIG. 1. The process 94 may be implemented as executable code instructions stored on a non-transitory tangible computer-readable medium, such as the volatile or non-volatile memory of the controller 18. In the depicted example, field instrument data may be input (block 96) into the DCS 20 and/or the SPLC 28 shown in FIG. 1. The field instrument data may include current operations data and sensor data from any of the components of the system 10, such as the gas turbine 12, the steam turbine 14, the loads 22, 24, the condenser 26, and the pump 46. The field instrument data may also include current operations data and sensor data from the HRSG 16 and HRSG 16 components (e.g., duct burner 44, economizers 48, 54, 60, evaporizers 50, 56, 62, heaters 66, 68, 72, 74). For example, the field instrument data may include temperatures, pressures, flow rates, vibration, fuel delivery rates, turbine 12 and 14 speeds, valve positions, and so forth. By using the field instrument data (block 96), the DCS 20 and/or the SPLC 28 may derive or be informed of the operating conditions and running state (e.g., loading, shutdown, unloading, tripping) for the system 10 components.

Operator input data may also be input (block 98) into the DCS 20 and/or the SPLC 28. For example, the operator input data may include a desired loading or unloading setpoint for the gas turbine 12 (e.g., 0-100% load), a desired fuel usage rate, and a desired operating modality (e.g., maximizing HRSG life, minimizing startup time, maximizing power plant power output, optimizing economic conditions). A current HRSG 16 stress may then be calculated (block 100). Various techniques may be used to calculate the current HRSG 16 stress, such as the techniques disclosed in U.S. patent application Ser. No. 12/907,187 filed on Oct. 19, 2010, and entitled "SYSTEMS, METHODS, AND APPARATUS FOR DETERMINING ONLINE STRESS AND LIFE CONSUMPTION OF A HEAT RECOVERY STEAM GENERATOR," which is hereby incorporated by reference in its entirety.

More specifically, the current HRSG 16 stress may be derived by using life prediction models, for example, physics-based models, statistical models, and or knowledge-based models (e.g., expert systems, fuzzy logic models) suitable for simulating and predicting the thermal behavior, mechanical behavior, and more generally, useful in predicting the impact of temperature, pressure, and/or vibration on the HRSG 16 and its components. For example, sensors may be used to measure values such as temperature, pressure and/or stress. In an example embodiment, the sensed values may be used to determine thermal-induced stresses, mechanical stresses and/or creep stress by using physics-based models, such as a low cycle fatigue (LCF) life prediction model, a computational fluid dynamics (CFD) model, a finite element analysis (FEA) model, a parametric solid model, a non-parametric solid model, a 3-dimension to 2-dimension FEA mapping model, or a combination thereof. Statistical models such as a regression analysis model, a data mining model, or a combination thereof, may also be used to determine thermal-induced stresses, mechanical stresses and/or creep stress. Additionally, HRSG 16 design parameters, such as pressure vessel design parameters, wall thicknesses, material types (e.g., metals, synthetic materials), coil sizes, nozzle design parameters, weld types, dimensions, tolerances, construction details, heat balance equations, heat transfer equations, operational envelopes, and/or design envelopes associated with the HRSG 16 and the HRSG's 16 components may be used in the models described herein for calculating the current HRSG stress (block 100).

The process 94 may also calculate projected or predicted gas turbine operational values, such as projected flow rates, temperatures, and pressures (block 102). For example, based on a desired setpoint for the gas turbine (e.g., 0-100% load), the process 94 may calculate a projected temperature curve, mass flow rate curve, and pressure curve for the gas turbine 12 exhaust 42. In one embodiment, gas turbine international standards organization (ISO) curves may be used, that take into account the gas turbine 12 type, ambient temperature, relative humidity, geographic elevation, and the system 10 operating configuration, to provide for the predicted gas turbine operational values (block 102). Gas turbine physics-based models, statistical models, and knowledge-based models may also be used to predict future values for temperature, mass flow rate, and pressure.

Additionally, the process 94 may calculate projected steam cycle conditions (block 104). For example, the temperature, pressure, and flow rate of the working fluid (e.g., steam) used by the HRSG 16, steam turbine 14, condenser 26, and pump 46 may be derived based on the field instrument data inputs (block 96), the operator inputs (block 98), and/or the projected gas turbine operation (block 102). Other steam cycle conditions may be predicted, such as entropy, heat energy captured, electrical power produced, and the like. One or more predicted HRSG 16 stresses as a function of time may then be calculated (block 106). For example, physics-based models, statistics-based models, and/or knowledge-based models may be use the values projected in blocks 100, 102, and 104 to derive the predicted HRSG 16 stresses as a function of time (block 106). Indeed, thermally-induced stresses, creep stresses, fatigue, and mechanical stresses may be predicted (block 106) in advance of actual occurrence of the stresses. The predicted stresses may then be used to identify predicted peak stresses (block 108). The identification of peak stresses (block 108) may use stress ranges, for example, to categorize the predicted stress levels into desired and undesired categories.

Predicting HRSG 16 stresses (block 106) and identifying peak stresses (block 108) enables the derivation of a control strategy (block 110) suitable for optimizing usage of the HRSG 16, and increasing the efficiency of the system 10. The derivation of the control strategy (block 110) may be based on using one or more operational modes. For example, in one embodiment of a HRSG 16 life maximizing mode, the identified peak stresses (block 108) may be used to derive control actions for components of the system 10 (e.g., gas turbine 12, steam turbines 14, combustor 32, compressor 34, condenser 26, pump 46) that may prevent the HRSG 16 stresses from reaching undesired levels. For example, the HRSG 16 stresses may be kept at approximately 50%-90%, 60%-80%, of peak stress limits. In one example of this life maximization mode, if the predicted HRSG 16 stresses would reach undesirable levels, the gas turbine 12 may be controlled, for example, to provide for temperatures, pressures, and mass flows that maintain the HRSG 16 stresses at levels suitable for maximizing the HRSG 16 life. Likewise, if the predicted HRSG 16 stresses are likely to remain at low levels, the gas turbine 12 loading may be increased to further optimize power production by the system 10.

Other components may be similarly controlled to maximize the HRSG's 16 life. For example, the steam turbine's 14 pressures, temperatures, and flow rates may be adjusted, the combustor 32 temperature may be controlled, the compressor 34 suction and discharge pressures may be regulated, the condenser 26 valves may be adjusted, and the pump 46 may be driven at lower or higher rates. Likewise, certain sections of the HRSG 16 may be controlled, for example, via bypass and/or discharge valves, to maximize life. For example, HRSG 16 sections having higher temperature differentials may be bypassed to lower the HRSG 16 stresses. Similarly, the attemperators 70 and 76 may be engaged to cool off certain portions of the HRSG 16. In this way, the HRSG's 16 life may be substantially maximized.

In a power output maximizing mode suitable for maximizing power output (e.g., power plant electrical power output), the HRSG 16 stresses may be allowed to increase over life maximization levels. For example, the HRSG 16 stresses may be allowed to be at approximately 90%-150%, 80%-110% of peak stress limits. Accordingly, the gas turbine 12 may be allowed to operate at higher exhaust temperatures, pressures, and flow rates. Additionally, the steam turbine 14 may be allowed to operate at higher working fluid temperatures, pressures, and flow rates. Indeed, the various components of the system 10 may be controlled to maximize power output of the system 10. However, the SPLC 28 may provide for the impact in the life of the HRSG 16 based on the current usage of the HRSG 16. For example, a life counter may be displayed by the SPLC 28 that shows a predicted reduction in the life of the HRSG 16 based on the new operating conditions. In this way, the power output produced by the system 10 may be maximized, and the impact of the new power output on the HRSG 16 may be provided.

In a startup time minimizing mode suitable for minimizing startup times (e.g., gas turbine 12 startup times), the HRSG 16 stresses may also be allowed to increase over life maximization levels. For example, the HRSG 16 stresses may be allowed to be at approximately 90%-150%, 80%-110% of peak stress limits. Accordingly, the gas turbine 12 may be allowed to operate at higher exhaust temperatures, pressures, and flow rates. As mentioned above, the SPLC 28 may show a predicted reduction in the life of the HRSG 16 based on the startup conditions, thus providing for feedback on the impact on the HRSG's 16 life of the minimized startup time. In this manner, startup times may be minimized, and the effect of the new startup time on the HRSG 16 may be provided.

In an economic conditions optimization mode suitable for optimizing economic conditions, economic and business conditions that may impact the system 10 may be used, in conjunction with the predicted HRSG 16 stresses, to maximize, for example, the economic value of the current power produced by the system 10. The economic and business conditions may include market data for the demand and supply of electrical power, data related to futures market, e.g., sales of future power output, and supply/demand data in regulatory markets, such as cap and trade markets (i.e., emissions markets). The economic and business data may be used in conjunction with economic models and the predicted HRSG 16 stresses to arrive at an energy valuation suitable for controlling various components of the system 10 (e.g., gas turbine 12, steam turbines 14, combustor 32, compressor 34, condenser 26, pump 46). For example, if the produced energy valuation is high, then HRSG 16 stresses may be allowed to be correlatively higher, and the system 10 components may be controlled to respect the newly derived higher HRSG 16 stresses. Likewise, if the energy valuation is low, then the HRSG 16 operating stresses may be allowed to be correlatively lower and the system 10 components may be controlled to respect the newly derived lower HRSG 16 stresses. In this way, economic and business conditions may be incorporated, suitable for optimizing the economic value of the system 10.

In a fuel usage minimizing mode suitable for minimizing fuel usage (e.g., gas turbine 12 fuel usage), the HRSG 16 stresses may be allowed to increase over life maximization levels in order to minimize the consumption of fuel by the system 10. For example, a fast start for the gas turbine 16 may also result in less consumption of fuel, but may raise certain HRSG 16 stresses above the levels suitable for maximizing the life of the HRSG 16. Accordingly, the SPLC 28 may show a predicted reduction in the life of the HRSG 16 based on the fuel minimization conditions. In this manner, fuel usage may be minimized and the corresponding impact on the HRSG's 16 life may be accounted for.

Controls actions may then be output (block 112), based on the derivation of the control strategy (block 110). For example, the gas turbine 12 may be ramped up or down, the speed of the turbines 12 and 14 may be held at a desired speed or at higher or lower speeds, the pump 46 may be driven at higher or lower pumping rates, and certain valves may be partially or fully opened or closed. In one embodiment, the DCS 20 and or the SPLC 28 may interface with the system 10 components to issue the desired control actions. The process 94 may then iteratively loop through the blocks 96, 98, 100, 102, 104, 106, 108, 110, and 112, as depicted. In one embodiment, the process 94 may iteratively loop through the blocks 96, 98, 100, 102, 104, 106, 108, 110, and 112 approximately every 10 to 100 milliseconds, 1 to 5 seconds, 10 to 60 seconds. By iteratively processing the blocks 96, 98, 100, 102, 104, 106, 108, 110, and 112, the process 94 may more accurately provide for control of the system 10 and optimize the usage of the HRSG 16.

In another embodiment of the process 94, the blocks 102, 104, and 106 may not be used, and instead, the process first calculates a current HRSG stress (block 100), as described above, and then continues (arrow 113) with the identification of peak stresses (block 108). In this embodiment, a control strategy may be derived (block 110), for example, by using certain pre-calculated curves, as described in more detail below with respect to FIG. 4.

Figure 4:
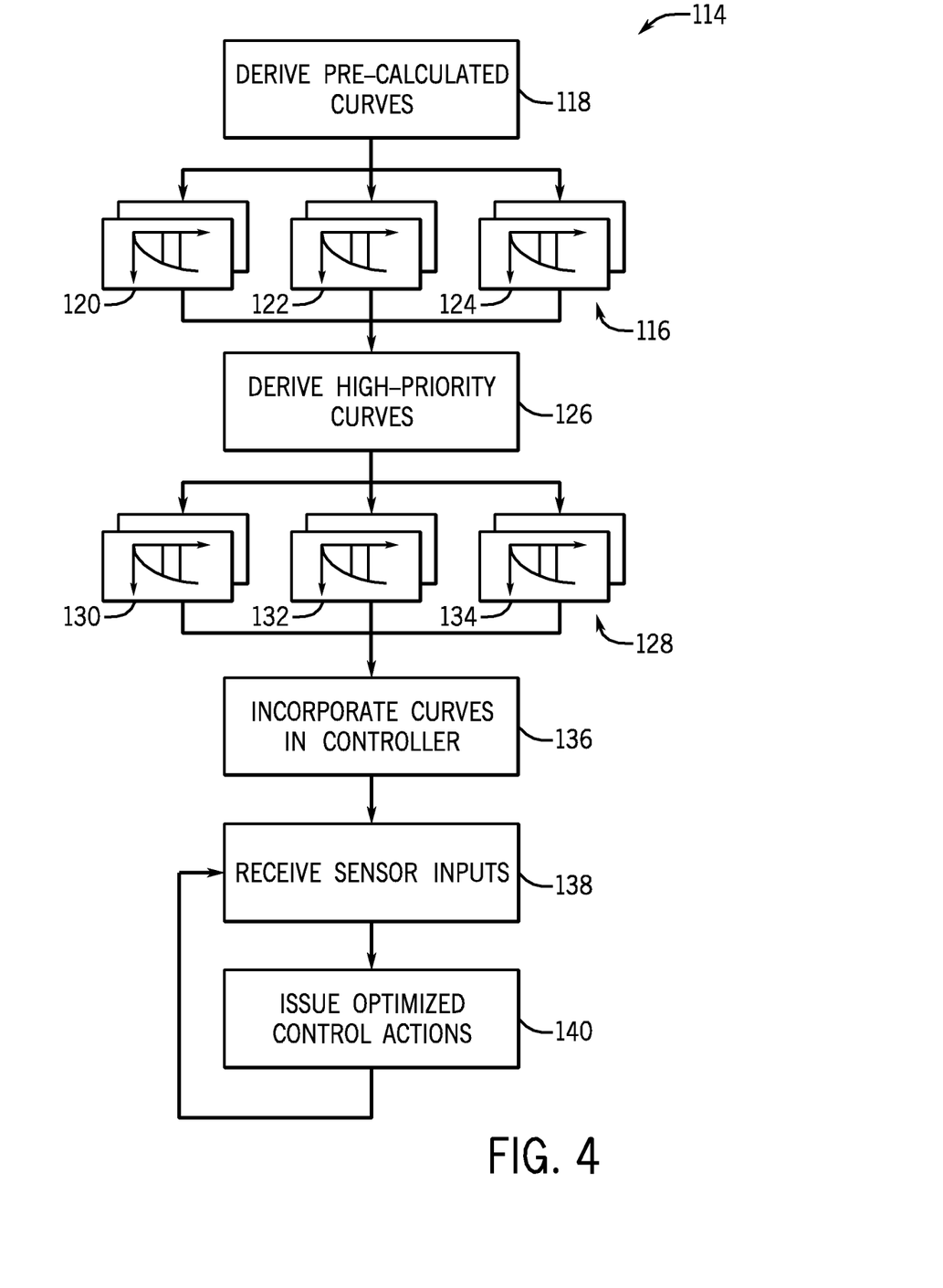
FIG. 4 is a flow chart of an embodiment of a process for improving system controls based on differential curve models.

FIG. 4 is a flow chart of an embodiment of a process 114 that may employ allowable differential curves 116 suitable for optimizing the usage of the HRSG 16. The allowable differential curves 116 may detail allowable differences in stresses as a function of time. Accordingly, a control strategy may be derived that keeps the stresses within limits defined by the curves 116. In one embodiment, the curves 116 are pre-calculated curves 116. That is, the curves 116 may include pre-calculated values suitable for faster derivations of control actions. Accordingly, the processing effort used in deriving control actions, such as control actions that optimize usage of the HRSG 16, may be substantially reduced by using the pre-calculated curves 116. The curves 116 may be stored in stored on a non-transitory tangible computer-readable medium, such as a volatile or non-volatile memory of the controller 18 shown in FIG. 1.

In the depicted embodiment, the process 114 may derive one or more of the pre-calculated allowable differential curves 116 (block 118), such as allowable differential temperature curves 120, allowable differential pressure curves 122, and allowable differential flow curves 124, suitable for including allowable temperatures, pressures, and flows, respectively. The curves 120, 122, and 124 may enable a control strategy wherein sensors (e.g., temperature, pressure, flow) are queried at different times and the difference in values, such as temperature, pressure, and flow differentials are used to derive control actions. In one embodiment, the curves 120, 122, and 124 may be developed by using the SPLC 28 shown in FIG. 1 in a simulation mode or in an allowable curves development mode. Indeed, the SPLC 28 may be receive simulated inputs, such as temperature, pressure, and flow inputs, of the various components of the system 10 (e.g., gas turbine 12, steam turbines 14, combustor 32, compressor 34, condenser 26, pump 46) and components of the HRSG 16 (e.g., duct burner 44, economizers 48, 54, 60, evaporizers 50, 56, 62, heaters 66, 68, 72, 74). The SPLC 28 may then use the techniques described above, such as a physics-based modeling, statistical modeling, and knowledge-based modeling, to derive the pre-calculated curves 120, 122, and 124.

For example, physics models suitable for describing the physical behavior of the various system 10 components and HRSG 16 components, including thermodynamic behaviors, material properties, creation of stress, creation of fatigue, and so forth, may be used to derive the curves 120, 122, and 124. Similarly, statistics-based models may be used to derive allowable temperature, pressure, and flow differentials based on statistical methodologies (e.g., linear regression, non-linear regression). For example, stresses resulting from differences in temperatures between an inner wall and an outer wall of the pressure vessels 52, 58, and 64 may be calculated. Likewise, stresses based on certain nozzle designs, tubing sizes, and the design of the duct burner 44, the economizers 48, 54, 60, the evaporizers 50, 56, 62, and the heaters 66, 68, 72, 74 may be derived. Additionally, the interactions between system 10 components with the HRSG 16 components may be used to derive the curves 120, 122, and 124. For example, the steam cycle interactions between the system 10 and HRSG 16 components may be used to derive the curves 120, 122, and 124. By deriving the curves 120, 122, and 124 based on the specific design and behavior of a given system 10 and HRSG 16, differential pressures, temperatures, and flow limits may be calculated that respect the structural integrity and life of the components of the system 10 and the HRSG 16 (block 118).

In one embodiment, the process 114 may then derive (block 126) high-priority curves 128 based on the pre-calculated curves 116. For example, certain high-priority components may be selected, such as the duct burner 44, the economizers 48, 54, 60, the evaporizers 50, 56, 62, and the heaters 66, 68, 72, 74, and any subcomponents or portions of the components (e.g., nozzles, pressure vessels 52, 58, 64, walls, tubing, nozzles) that may have a greater impact in the HRSG's 16 life and stresses. In this manner, high priority temperature curves 130, pressure curves 132, and flow curves 134 may be derived by the process 114. By using high-priority curves 128 instead of the full complement of the curves 116 to issue control actions, the process 114 may further reduce the computational resources used in processing sensor inputs and issuing control actions. In another embodiment, the curves 116 may be used to issue control actions. The high-priority curves 128 may then be programmed or otherwise installed (block 136), for example, in the controller 18. For example, the curves 128 may be stored on a non-transitory tangible computer-readable medium, such as a volatile or non-volatile memory of the controller 18.

Sensor inputs, including temperature inputs, pressure inputs, and flow inputs may be received by the controller 18 (block 138). The controller 18 may then issue optimized control actions (block 140). In one embodiment, the curves 130, 132, and 134 may be used for faster derivation of control actions. For example, a sensed temperature differential at a given location (e.g., inner vs. outer pressure vessel wall) may be compared to one or more curves 130 corresponding to the sensed location. The curves 130 may then provide for an estimate of allowable stress based on the sensed temperature differential and the time. Likewise, sensed pressure and flow differentials may be compared to one or more of the curves 132 and 134, respectively, to derive an estimate of allowable pressure and flow-induced stresses. Indeed, by using "lookup" algorithms that compare the sensed differentials (e.g., temperature, pressure, flow) against the curves 130, 132, and 134, a fast determination of allowable stresses is enabled, using minimal computing resources. Based on the determination of allowable stress, the optimized control actions (block 140) may be issued. For example, in an operations mode maximizing the life of the HRSG 16, the optimized control action may respect the allowable stress limits by issuing actions suitable for maintaining the stresses at approximately 50%-90% of allowable stress limits. In another example, in an operations mode minimizing the gas turbine startup time or in a mode suitable for maximizing power production, the control actions may be allowed to result in stress of approximately up to 90%-150% of allowable stress limits. Other operational modes may be used as described above, including modes that optimize fuel usage, modes that maximize power plant output, and modes that optimize economic conditions.

Technical effects of the invention include the ability to improve on the operational life of an HRSG, the ability to predict future HRSG conditions, including HRSG stresses, based upon current conditions of plant systems (e.g., gas turbines, steam turbines, condensers, and pumps). A SPLC may be provided, that processes system inputs and calculates a remaining life for the HRSG. The SPLC may also be used for dynamic control (e.g., open-loop or closed-loop control) of the plant based on the HRSG conditions (e.g., stresses) and operating modes (e.g., a HRSG life maximizing mode, using a fuel usage minimizing mode, using a power output maximizing mode, using a startup time minimizing mode, using an economic conditions optimization mode, or a combination thereof). The SPLC may use a closed or open-loop control to iteratively process inputs, derive control actions based on predicted HRSG conditions, and issue the control actions. Such control actions may improve the utilization of the HRSG and increase the efficiency of the plant. In certain embodiments, the technical effects include using pre-calculated curves suitable for calculating the HRSG future conditions that minimize the use of computing resources.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a controller configured to control power plant operations;
a heat recovery steam generator (HRSG) monitor communicatively coupled to the controller and configured to receive inputs corresponding to the power plant operations; and
an HRSG life prediction model configured to predict a remaining operating life for an HRSG component, wherein the HRSG monitor uses the HRSG life prediction model and the inputs to communicate a control action to the controller, wherein the HRSG life prediction model comprises a pre-calculated differential temperature curve model configured to model stress as a first function of a temperature difference over time.

2. The system of claim 1, wherein the HRSG life prediction model comprises a pre-calculated differential pressure curve model configured to model stress as a second function of a pressure difference over time, a pre-calculated differential flow curve model configured to model stress as a third function of a flow difference over time, or a combination thereof.

3. The system of claim 2, wherein the stress comprises a thermal stress, a creep stress, a mechanical stress, or a combination thereof.

4. The system of claim 1, wherein the HRSG life prediction model comprises a statistical model, a physics-based model, a knowledge-based model or a combination thereof.

5. The system of claim 4, wherein the statistical model comprises a regression analysis model, a data mining model, or a combination thereof.

6. The system of claim 4, wherein the physics-based model comprises a low cycle fatigue (LCF) life prediction model, a computational fluid dynamics (CFD) model, a finite element analysis (FEA) model, a parametric solid model, a non-parametric solid model, a 3-dimension to 2-dimension FEA mapping model, or a combination thereof.

7. The system of claim 1, wherein the inputs corresponding to the power plant operations comprise gas turbine system inputs, steam turbine system inputs, HRSG system inputs, condenser inputs, pump inputs, load inputs, duct burner inputs, superheater inputs, evaporator inputs, economizer inputs, boiler inputs, or a combination thereof.

8. The system of claim 1, wherein the control action comprises a gas turbine system control action, a steam turbine control action, a HRSG system control action, a condenser control action, a pump control action, or a combination thereof.

9. The system of claim 1, comprising a distributed control system (DCS), a human-machine interface (HMI) software, a manufacturing execution system (MES), a supervisor control and data acquisition (SCADA) system, or a combination thereof, and the HRSG monitor and the HRSG life prediction model are included in the DCS, the HMI, the MES, the SCADA, or the combination thereof.

10. A method comprising:
receiving, via a processor, field instrument data and operator input;
calculating, via the processor, a current heat recovery steam generator (HRSG) stress based on the field instrument data and the operator input;
projecting, via the processor, a turbine system condition based on the field instrument data and the operator input;
calculating, via the processor, a predicted HRSG stress based on the turbine system condition;
identifying, via the processor, a peak HRSG stress based on the predicted HRSG stress;
deriving, via the processor, a control strategy; and
outputting, via the processor, a control action based on the control strategy.

11. The method of claim 10, wherein calculating the current HRSG stress comprises calculating a current HRSG thermal stress, calculating a current HRSG creep stress, calculating a current HRSG mechanical stress, or a combination thereof.

12. The method of claim 10, comprising projecting, via the processor, a steam cycle condition based on the field instrument data and the operator input, wherein calculating the predicted HRSG stress based on the turbine system condition comprises calculating the predicted HRSG stress based on the steam cycle condition.

13. The method of claim 10, wherein deriving the control strategy comprises using a HRSG life maximizing mode, using a fuel usage minimizing mode, using a power output maximizing mode, using a startup time minimizing mode, using an economic conditions optimization mode, or a combination thereof.

14. The method of claim 10, wherein calculating the predicted HRSG stress based on the turbine system condition comprises using a pre-calculated allowable differential curve, a physics-based model, a statistical model, a knowledge-based model, or a combination thereof.

15. The method of claim 14, wherein the pre-calculated allowable differential curve comprises an allowable differential temperature curve, an allowable differential pressure curve, an allowable differential flow curve, or a combination thereof.

16. The method of claim 10, wherein identifying the peak HRSG stress comprises identifying a component affecting the predicted HRSG stress and identifying the peak stress based on the component.

17. The method of claim 16, wherein the component comprises a gas turbine system, a steam turbine system, a condenser, a pump, a load, a duct burner, a superheater, an evaporator, an economizer, a boiler, or a combination thereof.

18. A system comprising:
a controller configured to control plant operations, the controller comprising:
a heat recovery steam generator (HRSG) monitor configured to monitor the plant operations; and
an HRSG life prediction model configured to predict a stress and a remaining operating life in an HRSG component, wherein the controller is configured to use the HRSG monitor and the HRSG life prediction model to derive control actions, wherein the HRSG life prediction model comprises a pre-calculated differential temperature curve model configured to model stress as a first function of a temperature difference over time.

19. The system of claim 17, wherein the HRSG life prediction model comprises a pre-calculated allowable differential pressure curve, a pre-calculated allowable differential flow curve, a physics-based model, a statistical model, a knowledge-based model, or a combination thereof.

20. The system of claim 19, wherein the HRSG monitor is configured to simulate plant operations to derive the pre-calculated allowable differential curve.

* * * * *